(12) United States Patent
Donderici et al.

(10) Patent No.: US 9,983,329 B2
(45) Date of Patent: May 29, 2018

(54) SENSOR SYSTEM FOR DOWNHOLE GALVANIC MEASUREMENTS

(71) Applicant: Halliburton Energy Services, Inc., Houston, TX (US)

(72) Inventors: Burkay Donderici, Houston, TX (US); George David Goodman, Houston, TX (US); Etienne Samson, Cypress, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 3 days.

(21) Appl. No.: 15/021,980

(22) PCT Filed: Jun. 5, 2015

(86) PCT No.: PCT/US2015/034486
§ 371 (c)(1),
(2) Date: Mar. 15, 2016

(87) PCT Pub. No.: WO2016/195715
PCT Pub. Date: Dec. 8, 2016

(65) Prior Publication Data
US 2017/0160422 A1  Jun. 8, 2017

(51) Int. Cl.
*G01V 3/10* (2006.01)
*G01V 3/18* (2006.01)
(Continued)

(52) U.S. Cl.
CPC .............. *G01V 3/28* (2013.01); *E21B 47/123* (2013.01); *G01V 3/26* (2013.01)

(58) Field of Classification Search
CPC ... G01V 1/40; G01V 1/44; G01V 1/46; G01V 3/02; G01V 3/08; G01V 3/083;
(Continued)

(56) References Cited

U.S. PATENT DOCUMENTS 2,707,768 A * 5/1955 Owen ...................... G01V 3/24
324/373
3,052,835 A * 9/1962 Dunlap .................... G01V 3/18
324/339
(Continued)

FOREIGN PATENT DOCUMENTS

CA      2940029 A1 * 10/2015  ........... G01N 27/221
WO   2011130080 A2    10/2011
(Continued)

OTHER PUBLICATIONS

Search Report in IE Patent Application No. 2016/0112, dated Nov. 8, 2016.
(Continued)

*Primary Examiner* — Patrick Assouad
*Assistant Examiner* — Sean Curtis
(74) *Attorney, Agent, or Firm* — McDermott Will & Emery LLP

(57) ABSTRACT

A downhole galvanic logging system including a first transmitter electrode configured to convey an exciter current into a formation and a second transmitter electrode configured to receive a return current from the formation. A first transmission line being coupled to the first transmitter electrode and configured to carry the exciter current, and a second transmission line being coupled to the second transmitter electrode and configured to carry the return current. The transmission lines can be arranged in a twisted pattern. A receiver device is positioned between the transmitter electrodes along an axial length of the downhole galvanic logging system. The receiver device can be configured to detect an electrical signal that is proportional to a resistivity of the formation. The second transmitter electrode can be coupled to one end of the receiver device with the second (Continued)

transmission line coupled to the second transmitter electrode through the receiver device.

22 Claims, 6 Drawing Sheets

(51) Int. Cl.
  *G01V 3/28* (2006.01)
  *G01V 3/26* (2006.01)
  *E21B 47/12* (2012.01)
(58) Field of Classification Search
  CPC . G01V 3/108; G01V 3/18; G01V 3/20; G01V 3/26; G01V 3/34; G01V 3/40; G01V 3/38; G01V 3/28; E21B 47/12; E21B 23/14
  USPC .................................. 324/323–375; 702/6–13
  See application file for complete search history.

(56) References Cited

U.S. PATENT DOCUMENTS

| | | | | |
|---|---|---|---|---|
| 4,278,941 A * | 7/1981 | Freedman | G01V 3/28 | 324/339 |
| 4,642,570 A * | 2/1987 | Sternberg | G01V 3/24 | 324/362 |
| 4,714,889 A * | 12/1987 | Chapman | G01V 3/20 | 324/347 |
| 4,796,186 A * | 1/1989 | Kaufman | G01V 3/20 | 324/368 |
| 4,882,542 A * | 11/1989 | Vail, III | G01V 3/24 | 324/368 |
| 5,043,668 A * | 8/1991 | Vail, III | G01V 3/24 | 324/368 |
| 5,218,301 A * | 6/1993 | Kuckes | E21B 47/02 | 324/207.26 |
| 5,642,051 A * | 6/1997 | Babour | E21B 17/003 | 324/357 |
| 5,680,049 A * | 10/1997 | Gissler | E21B 17/1021 | 324/368 |
| 6,064,210 A * | 5/2000 | Sinclair | G01V 3/20 | 324/338 |
| 6,188,222 B1 * | 2/2001 | Seydoux | E21B 47/12 | 175/50 |
| 6,191,588 B1 | 2/2001 | Chen | | |
| 6,236,211 B1 * | 5/2001 | Wynn | G01V 3/02 | 324/357 |
| 6,359,438 B1 * | 3/2002 | Bittar | G01V 3/24 | 324/339 |
| 6,515,592 B1 * | 2/2003 | Babour | G01V 11/002 | 166/66 |
| 6,603,314 B1 * | 8/2003 | Kostelnicek | G01V 3/24 | 324/368 |
| 6,633,164 B2 * | 10/2003 | Vinegar | E21B 17/003 | 324/355 |
| 6,667,621 B1 * | 12/2003 | Benimeli | G01V 3/20 | 324/347 |
| 6,778,918 B2 * | 8/2004 | Delhomme | E21B 43/20 | 166/250.01 |
| 6,975,121 B2 * | 12/2005 | Strack | G01V 3/24 | 324/347 |
| 6,987,386 B1 * | 1/2006 | Vail, III | G01V 3/24 | 324/368 |
| 7,073,609 B2 | 7/2006 | Tabanou et al. | | |
| 7,202,671 B2 * | 4/2007 | Strack | G01V 3/24 | 324/355 |
| 7,242,194 B2 | 7/2007 | Hayman et al. | | |
| 7,272,503 B2 * | 9/2007 | Strack | G01V 3/24 | 324/370 |
| 7,388,382 B2 * | 6/2008 | Strack | G01V 3/24 | 324/355 |
| 7,679,368 B2 * | 3/2010 | Folberth | G01V 3/24 | 324/355 |
| 7,746,078 B2 * | 6/2010 | Bittar | G01V 3/24 | 324/357 |
| 7,876,102 B2 * | 1/2011 | Gold | G01V 3/24 | 324/355 |
| 8,141,631 B2 * | 3/2012 | Chouzenoux | E21B 47/122 | 166/250.01 |
| 8,242,928 B2 * | 8/2012 | Prammer | E21B 17/003 | 340/853.7 |
| 8,947,095 B2 * | 2/2015 | Bittar | G01V 3/24 | 324/355 |
| 9,069,097 B2 * | 6/2015 | Zhang | G01V 3/28 | |
| 9,081,114 B2 * | 7/2015 | Nie | G01V 3/24 | |
| 9,091,785 B2 * | 7/2015 | Donderici | E21B 47/123 | |
| 9,239,402 B2 * | 1/2016 | Li | G01V 3/24 | |
| 9,328,597 B2 * | 5/2016 | Morys | E21B 43/25 | |
| 9,547,100 B2 * | 1/2017 | Li | G01V 3/24 | |
| 9,557,439 B2 * | 1/2017 | Wilson | E21B 47/123 | |
| 9,568,633 B2 * | 2/2017 | Goodman | G01V 3/28 | |
| 9,611,736 B2 * | 4/2017 | Marsala | E21B 49/00 | |
| 9,696,450 B2 * | 7/2017 | Marsala | G01V 3/30 | |
| 2002/0043977 A1 * | 4/2002 | Vail, III | G01V 3/24 | 324/368 |
| 2002/0105332 A1 * | 8/2002 | Rosthal | G01V 3/28 | 324/338 |
| 2003/0011371 A1 * | 1/2003 | Rosthal | G01V 3/28 | 324/338 |
| 2003/0058127 A1 * | 3/2003 | Babour | G01V 11/002 | 340/854.3 |
| 2003/0090269 A1 * | 5/2003 | Fanini | G01V 3/28 | 324/339 |
| 2003/0122547 A1 * | 7/2003 | Prammer | G01V 3/24 | 324/368 |
| 2003/0229450 A1 * | 12/2003 | Strickland | G01V 3/28 | 702/10 |
| 2004/0095142 A1 * | 5/2004 | Dumont | G01V 3/20 | 324/323 |
| 2005/0179437 A1 | 8/2005 | Hayman et al. | | |
| 2005/0206385 A1 * | 9/2005 | Strack | G01V 3/24 | 324/347 |
| 2005/0264295 A1 * | 12/2005 | Strack | G01V 3/24 | 324/375 |
| 2006/0028208 A1 * | 2/2006 | Strack | G01V 3/24 | 324/355 |
| 2007/0168134 A1 * | 7/2007 | Strack | G01V 3/24 | 702/7 |
| 2008/0308271 A1 * | 12/2008 | Chouzenoux | E21B 47/01 | 166/250.02 |
| 2009/0159276 A1 * | 6/2009 | Chouzenoux | E21B 47/122 | 166/254.1 |
| 2009/0224766 A1 | 9/2009 | Wang et al. | | |
| 2009/0289808 A1 * | 11/2009 | Prammer | E21B 17/003 | 340/853.7 |
| 2009/0302854 A1 * | 12/2009 | Forgang | G01V 3/24 | 324/355 |
| 2010/0155138 A1 * | 6/2010 | Kuckes | E21B 47/022 | 175/45 |
| 2011/0057656 A1 * | 3/2011 | Tchakarov | E21B 10/00 | 324/369 |
| 2011/0248716 A1 * | 10/2011 | Folberth | G01V 3/24 | 324/338 |
| 2011/0308789 A1 * | 12/2011 | Zhang | G01V 3/28 | 166/250.01 |
| 2012/0074946 A1 * | 3/2012 | Forgang | G01V 3/24 | 324/355 |
| 2013/0234718 A1 * | 9/2013 | Li | G01V 3/24 | 324/355 |
| 2013/0239673 A1 * | 9/2013 | Garcia-Osuna | E21B 17/16 | 73/152.46 |
| 2013/0257436 A1 * | 10/2013 | Bittar | G01V 3/24 | 324/355 |
| 2013/0319659 A1 * | 12/2013 | Freedman | E21B 7/04 | 166/250.01 |
| 2014/0191120 A1 * | 7/2014 | Donderici | E21B 47/123 | 250/265 |
| 2014/0191761 A1 * | 7/2014 | San Martin | E21B 47/011 | 324/339 |

(56) References Cited

U.S. PATENT DOCUMENTS

| | | | | |
|---|---|---|---|---|
| 2014/0203810 | A1* | 7/2014 | Marsala | G01V 3/30 324/338 |
| 2014/0222343 | A1* | 8/2014 | Samson | G01V 8/10 702/8 |
| 2014/0306710 | A1* | 10/2014 | Nie | G01V 3/24 324/355 |
| 2014/0367092 | A1* | 12/2014 | Roberson | E21B 47/00 166/250.01 |
| 2014/0368201 | A1* | 12/2014 | Leblanc | G01V 3/26 324/339 |
| 2014/0368202 | A1* | 12/2014 | San Martin | G01V 3/26 324/339 |
| 2014/0368203 | A1* | 12/2014 | Samson | G01V 3/28 324/339 |
| 2015/0137817 | A1* | 5/2015 | Wilson | E21B 43/10 324/333 |
| 2015/0219784 | A1* | 8/2015 | Hibbs | G01V 3/24 324/338 |
| 2016/0091627 | A1* | 3/2016 | Donderici | G01V 3/24 324/366 |
| 2016/0139289 | A1* | 5/2016 | Donderici | G01V 3/24 324/366 |
| 2016/0259081 | A1* | 9/2016 | Goodman | G01V 3/28 |
| 2016/0259085 | A1* | 9/2016 | Wilson | E21B 47/123 |
| 2016/0298444 | A1* | 10/2016 | Donderici | E21B 7/04 |
| 2016/0327676 | A1* | 11/2016 | San Martin | G01V 3/18 |
| 2016/0356911 | A1* | 12/2016 | Wilson | G01N 27/221 |
| 2017/0068015 | A1* | 3/2017 | Morrison | G01V 3/08 |
| 2017/0068016 | A1* | 3/2017 | Donderici | E21B 47/0905 |
| 2017/0138132 | A1* | 5/2017 | Wilson | E21B 17/028 |
| 2017/0160422 | A1* | 6/2017 | Donderici | G01V 3/28 |
| 2017/0321544 | A1* | 11/2017 | Wilson | E21B 49/00 |
| 2017/0342822 | A1* | 11/2017 | Wilson | E21B 47/09 |

FOREIGN PATENT DOCUMENTS

| | | | | |
|---|---|---|---|---|
| WO | | 2012047436 | A1 | 4/2012 |
| WO | | 2015023270 | A1 | 2/2015 |
| WO | | 2015023271 | A1 | 2/2015 |
| WO | | 2015112136 | A1 | 7/2015 |
| WO | | 2015142352 | A1 | 9/2015 |
| WO | | 2015178876 | A1 | 11/2015 |
| WO | WO | 2016195715 | A1 * | 12/2016 ... E21B 47/123 |

OTHER PUBLICATIONS

International Search Report and Written Opinion for PCT/US2015/034486 dated Feb. 5, 2016.

Netherlands Search Report and Written Opinion from NL Application No. 1041822, dated Dec. 21, 2016.

* cited by examiner

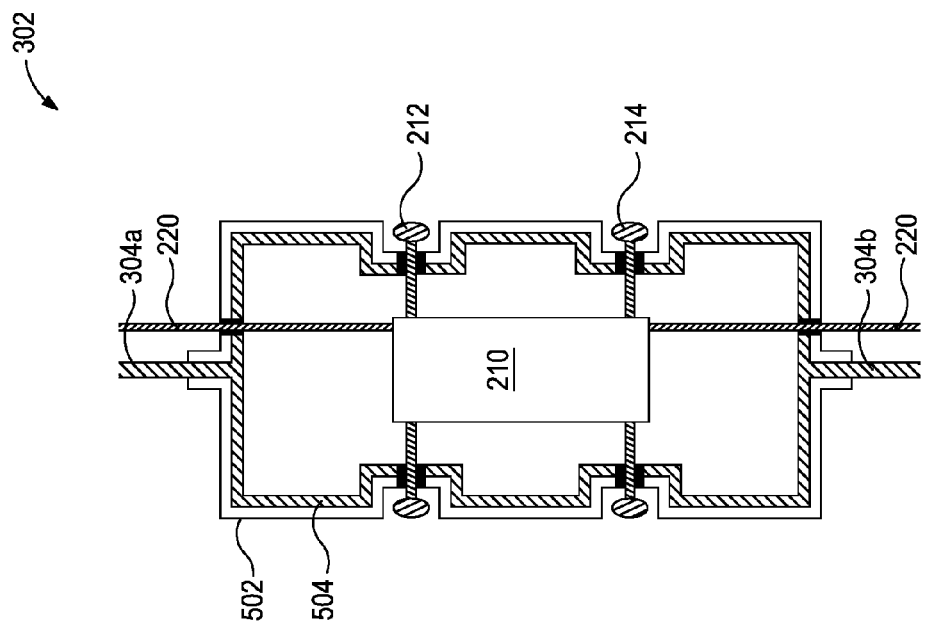
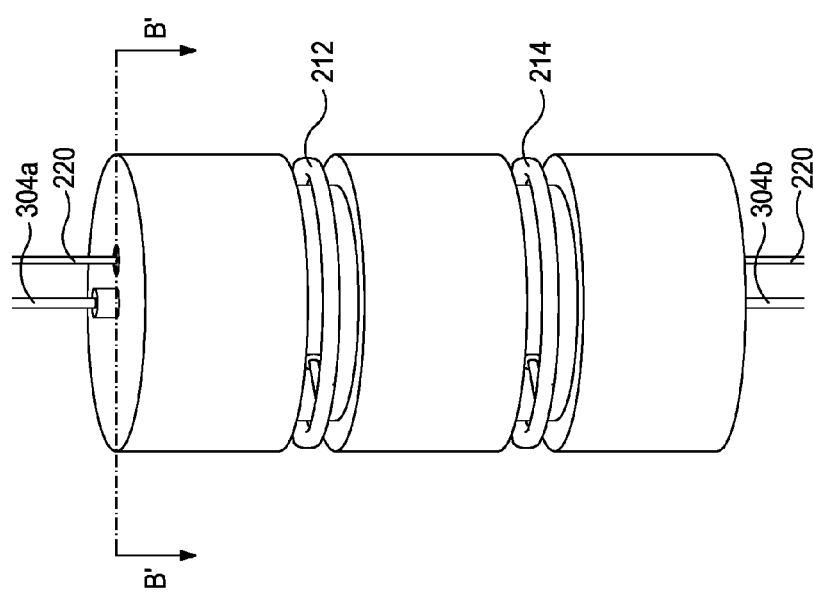
FIG. 5B
FIG. 5A

SENSOR SYSTEM FOR DOWNHOLE GALVANIC MEASUREMENTS

BACKGROUND

The present disclosure relates to equipment used during subterranean formation operations and, more particularly, to permanent electrode sensors that enable galvanic measurements in downhole applications.

Hydrocarbons are typically produced from wellbores drilled from the Earth's surface through a variety of producing and non-producing subterranean zones. The wellbore may be drilled substantially vertically or may be drilled as a lateral well that has some amount of horizontal displacement from the surface entry point. A variety of servicing operations may be performed in the wellbore, such as mechanical intervention services and formation property evaluations, after it has been drilled by lowering different kinds of downhole tools into the wellbore. For example, measuring instruments are commonly lowered into the wellbore to obtain various downhole conditions, such as depth-dependent formation pressure and temperature, formation porosity, fluid viscosity, and density. Various sampling and/or logging devices are also commonly lowered into the wellbore to either analyze fluid samples in-situ at various target zones of the subterranean formation or extract formation fluids for surface laboratory analysis.

The logging devices may include galvanic monitoring systems that typically use monopole or dipole electric sources. A measured signal results from a relatively high excitation level that is delivered from the surface. Such systems include separated excitation electrodes that force current to flow in a surrounding formation. Conduction currents flow within the formation producing a net voltage drop and induced magnetic fields. The galvanic monitoring systems include electromagnetic (EM) receivers that can sense a small signal representing a desired property of the formation. In electric receiver systems, the net voltage drop is sensed. In magnetic receiver systems, the induced magnetic fields are sensed. The receivers are positioned between the excitation electrodes along the tools length.

Since both wires of the excitation source and measurement sensors reside within a borehole, direct cross coupling formed between the excitation source and the measurement sensors limit the system's sensitivity to a desired formation measurement. This direct cross coupling is referred to as crosstalk coupling. The intended electric or magnetic field measurements are susceptible to errors resulting from the crosstalk coupling, such as time varying magnetic fields that are produced by the wires that carry the current to the excitation electrodes.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

FIGS. 5A and 5B are examples of a receiver device in an exemplary downhole sensor system of a downhole galvanic logging system in accordance with one or more embodiments of the subject technology, where FIG. 5A is a perspective view of the receiver device and FIG. 5B is a cross-sectional view of the receiver device.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology.

It is desirable to improve existing galvanic monitoring systems to suppress time varying magnetic fields that are produced by wires that carry current to excitation electrodes. The present disclosure relates to routing and terminating connections within a permanent monitoring system for minimizing undesired coupling that is destructive to a system's intended measurement. The subject system reduces parasitic crosstalk voltage that is induced into the measurement, thus allowing systems to be developed that provide improved measurement sensitivities and improved answer products. For example, permanently deployed galvanic measurement systems can be developed that operate at very high formation resistivity ranges, result in simpler firmware and processing design for the measurement, higher quality formation resistivity measurements and increased depth of detection in a water flood monitoring application. The subject system may be used with fiber optic electromagnetic receivers to achieve high depth of investigation.

Figure 1:
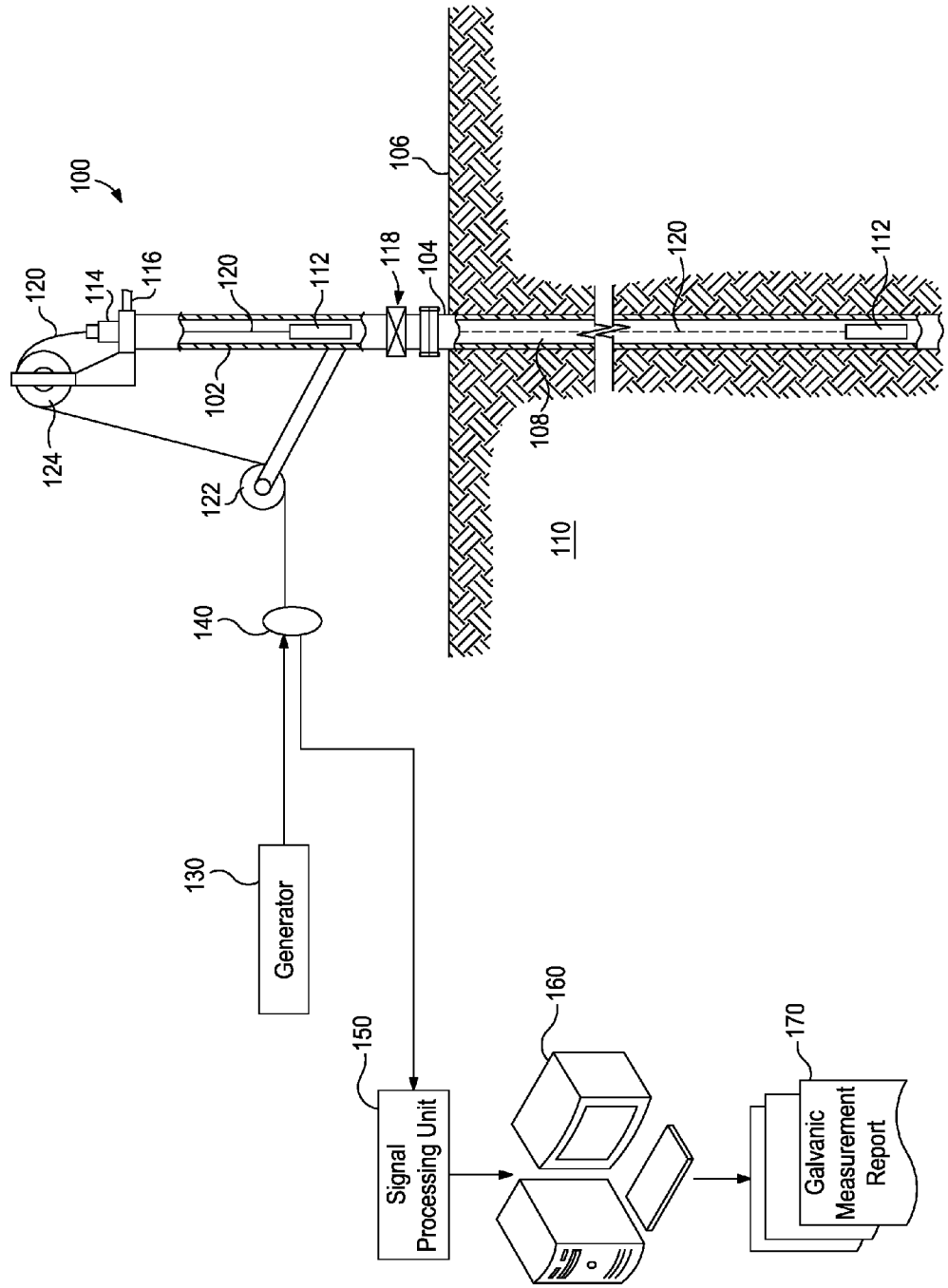
FIG. 1 is a schematic diagram of a wellbore system that may embody the principles of the present disclosure.

FIG. 1 is a schematic diagram of a wellbore system 100 that may embody the principles of the present disclosure. Referring to FIG. 1, the wellbore system 100 may include a lubricator 102 operatively coupled to a wellhead 104 installed at the surface 106 of a wellbore 108. As illustrated, the wellbore 108 extends from the surface 106 and penetrates a subterranean formation 110 for the purpose of recovering hydrocarbons therefrom. While shown as extending vertically from the surface 106 in FIG. 1, it will be appreciated that the wellbore 108 may equally be deviated, horizontal, and/or curved over at least some portions of the wellbore 108, without departing from the scope of the disclosure. The wellbore 108 may be cased, open hole, contain tubing, and/or may generally be characterized as a hole in the ground having a variety of cross-sectional shapes and/or geometries as are known to those of skill in the art. Furthermore, it will be appreciated that embodiments disclosed herein may be employed in onshore or offshore wells.

The lubricator 102 may be coupled to the wellhead 104 using a variety of known techniques, such as a clamped or bolted connection. Moreover, additional components (not shown), such as a tubing head and/or adapter, may be positioned between the lubricator 102 and the wellhead 104. The lubricator 102 may be an elongate, high-pressure pipe or tubular that provides a means for introducing a downhole tool 112 into the wellbore 108 in order to undertake a variety of servicing operations within the wellbore 108. The top of the lubricator 102 may include a stuffing box 114 fluidly coupled to a high-pressure grease-injection line 116 used to introduce grease or another type of sealant into the stuffing box 114 in order to generate a seal. The lower part of the lubricator 102 may include one or more valves 118, such as an isolating valve or swab valve.

A sensing cable 120 is extended into the lubricator 102 via the stuffing box 114 and attached at one end to the downhole tool 112. In one or more implementations, the sensing cable 120 is attached to with a weight object to strengthen the sensing cable 120 without touching a production-tubing wall of the wellbore 108. The sensing cable 120 may be made of composite slickline or optical fiber embedded wireline. As used herein, the term "slickline cable" is meant to also refer to wireline, wireline cable, or any derivative thereof. Accordingly, the embodiments described herein are equally applicable to wireline cable, without departing from the scope of the present disclosure. In one or more implementations, the sensing cable 120 is part of a distributed acoustic sensing system that is used for downhole vertical seismic profiling measurement.

The sensing cable 120 provides a conveyance means used to transport the downhole tool 112 into the wellbore 108 such that the desired wellbore servicing operations can be undertaken. The sensing cable 120 is generally fed to the lubricator 102 from a spool or drum (not shown) and through one or more sheaves 122, 124 before being introduced into the stuffing box 114 which provides a seal about the sensing cable 120 as it slides into the lubricator 102. Those skilled in the art will readily recognize that the arrangement and various components of the lubricator 102 and the wellhead 104 are described merely for illustrative purposes and therefore should not be considered limiting to the present disclosure. Rather, many variations of the lubricator 102 and the wellhead 104 may be had, without departing from the scope of this disclosure.

The downhole tool 112 may be positioned within the wellbore 108. The sensing cable 120 may be communicably coupled to a signal processing unit 150 through a coupler 140 at the surface 106, which may collect measurements gathered by the downhole tool 112. The coupler 140 may include a switch such as an optical coupler to switch between bi-directional optical signals to/from the sensing cable 120. In certain embodiments, the downhole tool 112 may be used in a wireline logging system, in which a drill string is pulled out of the wellbore 108 so that wireline logging tools may be introduced within the wellbore 108.

In one or more implementations, the downhole tool 112 depicts a galvanic tool, such as an array laterolog. The downhole tool 112 may include a downhole sonde that includes electrodes that transmit a current from a generator 130 arranged at the surface 106 into the formation 110. In this example, a receiver system may be installed and connected with the downhole tool 112 for detecting voltage and/or magnetic fields along the cable length inside the wellbore 108. The measurements may include, for example, resistivity measurements of the formation 110. In one or more implementations, the measurements include dielectric measurements such as dielectric properties relating to the formation 110. In this example, the downhole tool 112 is used to measure signals and values that can then be used to compute the resistivity of the formation 110 by a computing system 160 at the surface 106. The computing system 160 can then generate one or more galvanic measurement reports 170 with the computed resistivity of the formation 110 and/or an image of the formation 110.

Figure 2:
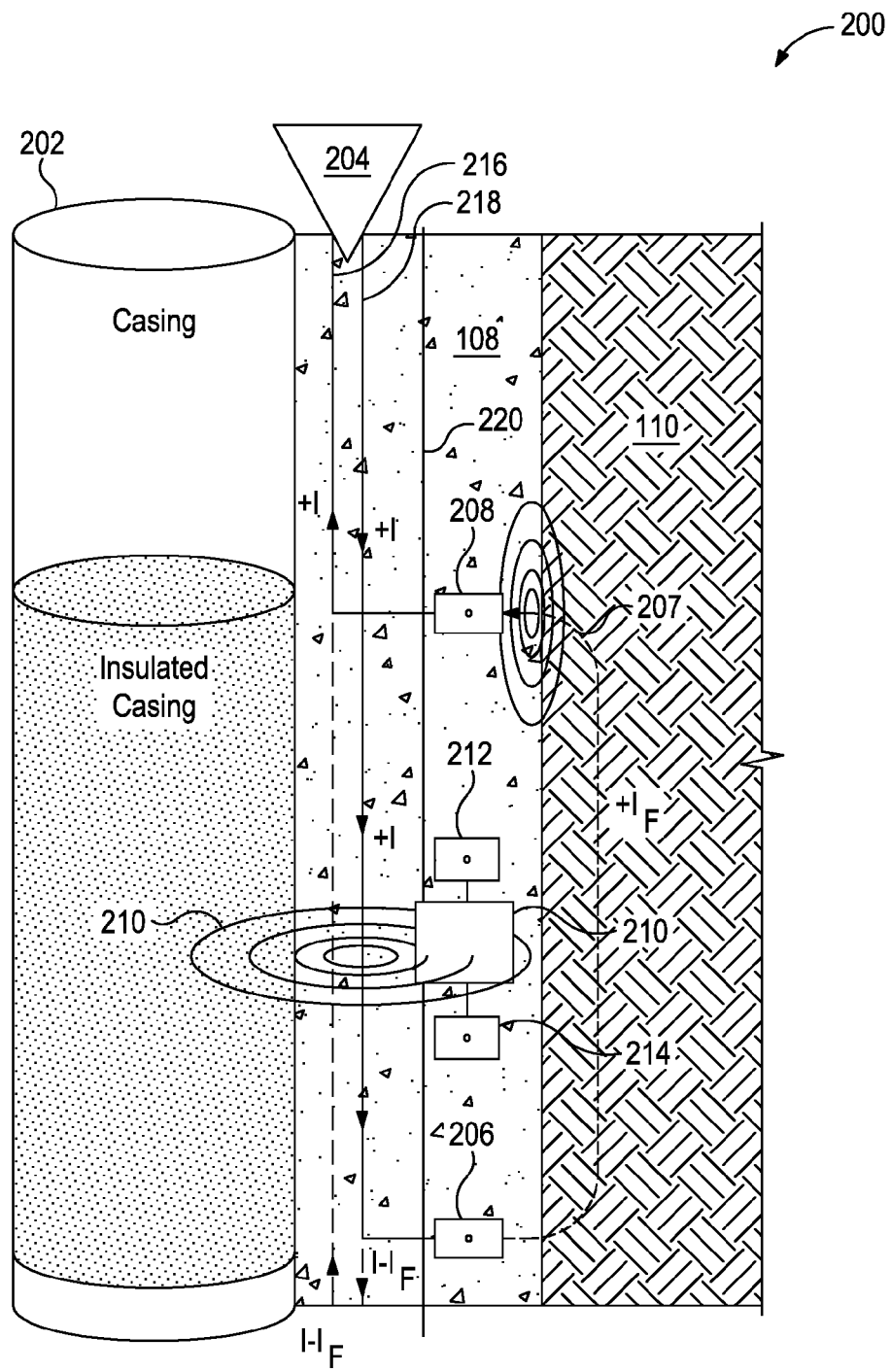
FIG. 2 is an example of a galvanic measurement system with downhole sensors arranged in a wellbore.

FIG. 2 is an example of a galvanic measurement system 200 with downhole sensors arranged in a wellbore. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

The galvanic measurement system 200 includes exciter electrodes 206 and 208 depicted as transmitter electrodes and voltage sense electrodes 212 and 214 depicted as monitor electrodes that are connected to a sensor device 210. In this example, the exciter electrodes 206 and 208 are arranged in the wellbore 108, such as being permanently mounted onto a cement-based insulated casing 202 of the wellbore 108. In one or more implementations, the exciter electrodes 206 and 208 are non-permanently mounted onto the wellbore 108. The exciter electrodes 206 and 208 have respective connections to an exciter 204 arranged at the surface through respective transmission lines 216 and 218. The exciter dotted lines indicate potential connections to other exciter electrodes (not shown) below for generality. The transmission lines 216 and 218 are understood to be a means of transferring energy from one location to another without radiating or producing significant loss in the transferred energy signal. In one or more implementations, the transmission lines 216 and 218 are made up of two or more conductors and can be referred to as transmission line conductors.

The sensor device 210 can be of an electric type or a magnetic type, but an electric receiver that embodies a fiber based sensor is depicted. The sensor device 210 is communicably coupled to the surface through optical fibers 220 that extend along an axial distance of the wellbore 108. The optical fibers 220 can be communicably coupled to one or more receivers downstream into the wellbore 108. In one or more implementations, the sensor device 210 is communicably coupled to magnetic sensor ports (not shown) in place of the voltage sense electrodes 212 and 214 if the sensor device 210 is of the magnetic type. One example of a magnetic sensor device is a coil with an arbitrary number of windings. Such magnetic sensor based on coil can be wound around the casing. Two ends of the coil are used as ports to couple to the sensor device 210.

In operation, the exciter 204 generates and injects an exciter current between the exciter electrodes 206 and 208 that flows through the formation 110 as formation current 207 to complete the loop. In this example, a voltage is generated on the sensor device 210 (e.g., a fiber EM sensor) that is a function of a resistivity of the formation 110, and the voltage creates an electrical signal that is converted and transmitted to the surface as an optical signal through the optical fibers 220. The exciter 204 may be referred to as a transmitter or a generator of the exciter current.

This type of system could be used, for example, to monitor movements of water floods and calculate the distance to an approaching water front in a production enhancement operation. One of the drawbacks of this application is that the exciter current I that is carried by the insulated exciter wires (e.g., the transmission lines 216 and 218) is typically large and it is not balanced, having a total current level of $I-I_F$, where $I_F$ is the formation current. Similar coupling can be observed at the exciter electrode 208 since the formation current 207 is also relatively large and unbalanced. As a result, the exciter wires generate strong magnetic fields that are picked up by the nearby receiver (e.g., the sensor device 210) as voltage perturbations. This coupling can create a relatively large signal on the sensor device 210 and may significantly degrade the dynamic range and accuracy of the sensor device 210. Even though cancellations of the direct coupling signal can be made after the measurement is obtained, such post-measurement removal would significantly degrade the dynamic range of the measurement.

Figure 3:
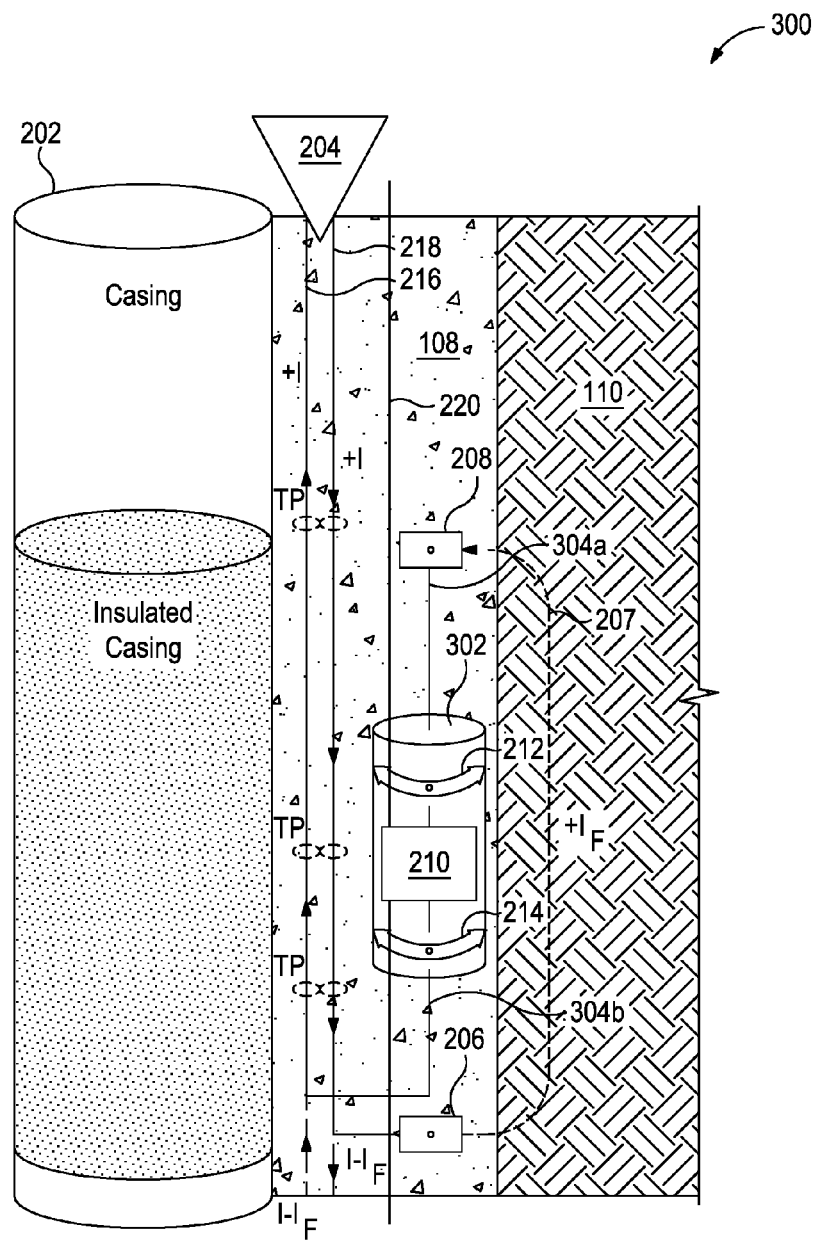
FIG. 3 is an example of a downhole galvanic logging system with an exemplary downhole sensor system in accordance with one or more embodiments of the subject technology.

FIG. 3 is an example of a downhole galvanic logging system 300 with an exemplary downhole sensor system in accordance with one or more embodiments of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

In FIG. 3, the downhole galvanic logging system 300 provides an example of electric dipole excitation. In this embodiment, the downhole galvanic logging system 300 includes a first transmitter electrode (e.g., the exciter electrode 206) configured to transmit the exciter current into the formation 110 and a second transmitter electrode (e.g., the exciter electrode 208) configured to receive the formation current 207 based on the exciter current conveyed through the formation 110. In one or more implementations, the exciter electrode 206 is part of a first set of transmitter electrodes and the exciter electrode 208 is part of a second set of transmitter electrodes. In this embodiment, each of the first and second sets of transmitter electrodes may include a respective number of transmitter electrodes. The downhole galvanic logging system 300 also includes a first transmission line (e.g., the transmission line 218) coupled to the exciter electrode 206 and configured to carry the exciter current. The downhole galvanic logging system 300 also includes a second transmission line (e.g., the transmission line 216) coupled to the exciter electrode 208 and configured to carry a return current based on the formation current 207. In this embodiment, the transmission line 216 is arranged in parallel to the transmission line 218 (e.g., a parallel pattern) to minimize the amount of resulting magnetic field formed beyond the pair of transmission lines 216 and 218. In this example, the parallel pattern may terminate where respective connection paths to the exciter electrodes 206 and 208 begin. In one or more implementations, the transmission line 216 is arranged in a twisted pattern with the transmission line 218.

The exciter 204 is coupled to the transmission line 216 and the transmission line 218, in which the exciter 204 is configured to generate the exciter current. In this example, the exciter current generated can have a total current value of I to support any downstream connections to other exciter electrodes arranged within the wellbore 108.

In the downhole galvanic logging system 300, the insulated wire (e.g., the transmission line 218) that carries the power to the (+) exciter electrode (e.g., the exciter electrode 206) is part of a twisted pair with very low resulting magnetic fields and hence very low coupling among the transmission lines 216 and 218. In this example, the transmission lines 216 and 218 are well coupled resulting in diminishing magnetic field at distances greater than the separation distance between the twisted pair.

In addition, the downhole galvanic logging system 300 includes a receiver device 302 depicted as a conductive sensor packaging. In this embodiment, the receiver device 302 is positioned between the exciter electrode 206 and the exciter electrode 208 along an axial length of the downhole galvanic logging system (e.g., the length of the sensing cable 120). The receiver device 302 is configured to transform the voltage that is present between electrodes 206 and 208 into an optical signal on the fiber 220. Since the detected voltage is a function of the electrical properties of the formation 110, such as resistivity or dielectric constant, generated optical signal can be used as an indication of the electrical properties of the formation 110. In one or more implementations, the in-phase component of the voltage is proportional to the resistivity, and the out-of-phase component is proportional to the permittivity of the formation 110.

In one or more implementations, the exciter electrode 208 is attached to one end of the receiver device 302 with the transmission line 216 connected to the exciter electrode 208 through the receiver device 302. For example, the return current can return in the conductive housing of the receiver device 302, thus resulting in relatively little or no magnetic fields to form in the conductive housing 302 that can be harmful to the intended measurement. In this example, the objective is to return the exciter current back to a transmission point of at least the transmission line 216 to avoid the return current coupling with the measurement. In some aspects, the connection from the (−) exciter electrode (e.g., the exciter electrode 208) to the top end of the receiver device 302 causes the formation current to return over the receiver device 302. This type of connection creates no resulting magnetic fields inside the packaging as long as the exciter's return current is distributed substantially uniform around most of the outer circumference of the receiver device 302. In this example, the receiver device 302 has a symmetrical packaging shape as shown in FIG. 3. In one or more implementations, the receiver device 302 has an asymmetrical shape.

In one or more implementations, the exciter electrode 206 and the exciter electrode 208 have exciter wire connections at opposite ends of the receiver device 302 that are substantially centered and axially oriented relative to the receiver device for at least a first axial distance along the wellbore 108. In addition, the exciter electrode 206 and the exciter electrode 208 are substantially equidistant from respective ends (e.g., top and bottom) of the receiver device 302. In this embodiment, line portion 304b has a length that is substantially the same as a length of line portion 304a. In this example, the azimuthal current imbalance that is created on the conductive sensor packaging is reduced and the field cancellation in the packaging can be optimized. It is noted that the symmetric packaging can only balance the currents that are due to return current that is on the conductive housing. The formation current 207 that is coupling from the formation 110 can be unbalanced due to the asymmetrical nature of the formation currents.

In some aspects, the line portion 304a has a longer length than the line portion 304b, thus causing the connections to be at least a second axial distance apart along the wellbore 108, where the second axial distance is greater than the first axial distance. In one or more implementations, the exciter electrode 206 and the exciter electrode 208 have non-centered orientations relative to the receiver device 302.

In one or more implementations, the downhole galvanic logging system 300 includes a second receiver device (not shown) at a first distance from the surface. In FIG. 3, the receiver device 302 has a second distance from the surface. As such, the first distance is greater than the second distance to depict that the second receiver device is located downstream from the receiver device 302 into the wellbore 108. The second receiver device may be configured to detect a second electrical signal based on a second exciter current flowed within the formation 110. In this example, the second exciter current may have a current value of $I_2=I_r-I_1$ such that the second exciter current (e.g., $I_2$) is smaller than the exciter current (e.g., $I_1$) flowed through the formation 110 between the exciter electrodes 206 and 208.

The configuration shown in the downhole galvanic logging system 300 can significantly reduce crosstalk in galvanic permanent monitoring system applications. The downhole galvanic logging system 300 can be implemented with quadrature detection to further improve the performance of the system. The received voltage signals can be referenced to the generator 130 and a relative phase for the voltage may be computed. The in-phase component of the voltage can be depicted as the desired signal, while the out-of-phase (quadrature) component is the crosstalk signal. An alternative method that can be implemented with the downhole galvanic logging system 300 is to make measurements of the crosstalk signal at the surface and subtract the crosstalk signals out from the desired resistivity measurements after each measurement downhole.

Figure 4:
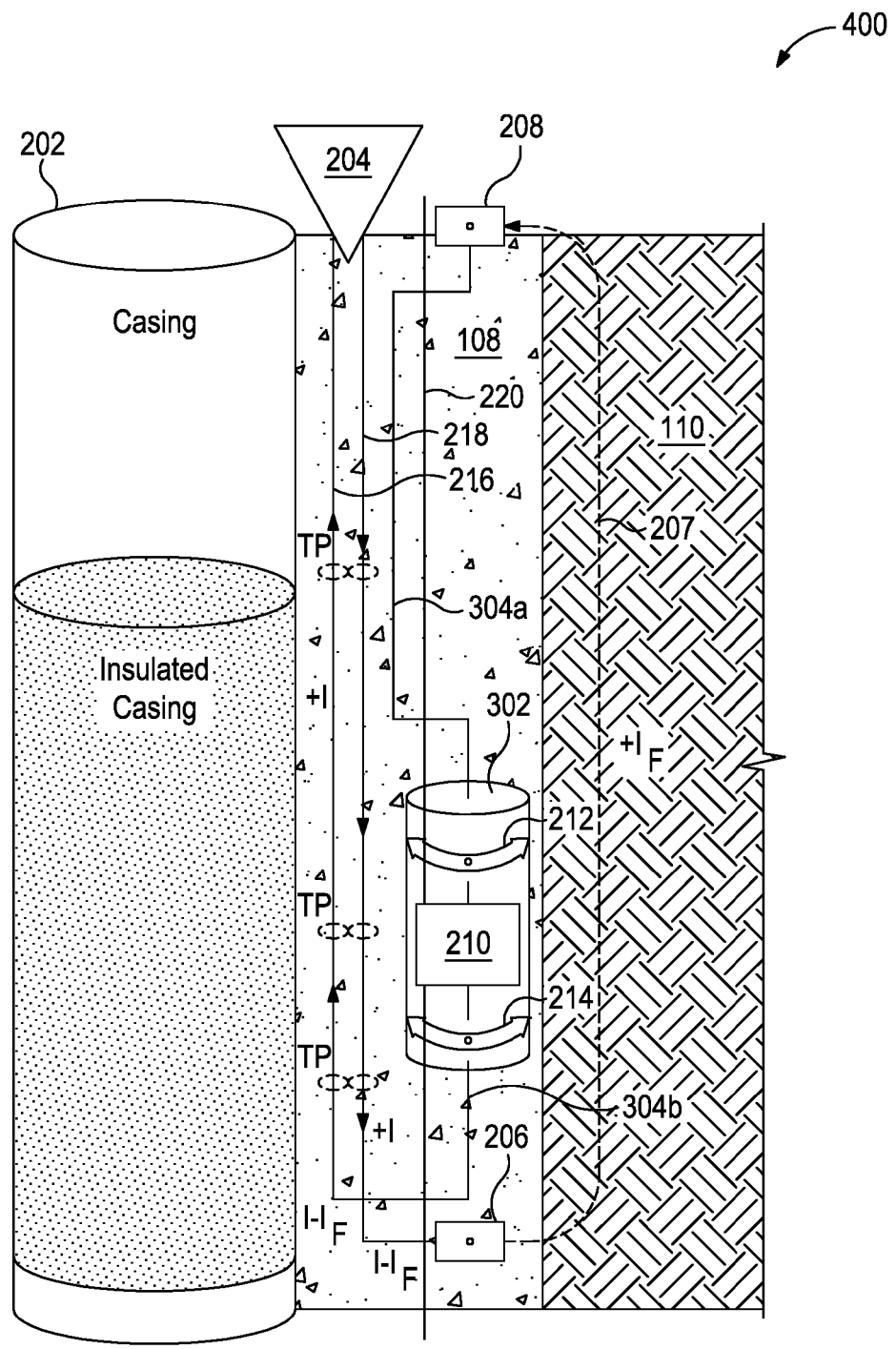
FIG. 4 is an example of a downhole galvanic logging system with another exemplary downhole sensor system in accordance with one or more embodiments of the subject technology.

FIG. 4 is an example of a downhole galvanic logging system 400 with another exemplary downhole sensor system in accordance with one or more embodiments of the subject technology. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided. For simplicity of discussion, not all of the depicted components may be discussed since many of the depicted components of FIG. 4 are the same as those depicted components of FIG. 3, and any discussion relevant to the depicted components of FIG. 4 can be referred to the discussion of FIG. 3.

In FIG. 4, the downhole galvanic logging system 400 provides an example of electric monopole excitation. In this example, the exciter electrode 206 and the exciter electrode 208 have connections at opposite ends of the receiver device 302 for at least a second axial distance along the wellbore 108, in which the second axial distance is greater than the first axial distance depicted in FIG. 3. In this embodiment, the exciter electrode 206 is located at a first distance from a first end (e.g., bottom end) of the receiver device 302 and the exciter electrode 208 is located at a second distance from a second end (e.g., top end) of the receiver device 302 with the second distance being greater than the first distance.

The exciter electrodes 206 can transmit a current signal through the formation 110 such that the return current is captured by the exciter electrode 208 at the second axial distance with the return current distributed uniformly across the circumference of the receiver device 302. In the configuration shown in the downhole galvanic logging system 400, the crosstalk among the transmission lines 216 and 218 as well as any crosstalk between the exciter electrodes 206 and 208 is significantly reduced for galvanic permanent monitoring system applications.

FIGS. 5A and 5B are examples of a receiver device 302 in an exemplary downhole sensor system of a downhole galvanic logging system in accordance with one or more embodiments of the subject technology, where FIG. 5A is a perspective view of the receiver device 302 and FIG. 5B is a cross-sectional view of the receiver device 302 along the line B-B' of FIG. 5A. Not all of the depicted components may be required, however, and one or more implementations may include additional components not shown in the figure. Variations in the arrangement and type of the components may be made without departing from the spirit or scope of the claims as set forth herein. Additional components, different components, or fewer components may be provided.

Referring to FIG. 5A, the receiver device 302 includes at least two monitor electrodes (e.g., voltage sense electrodes 212 and 214) that are configured to detect a voltage drop between them. The voltage sense electrodes 212 and 214 are depicted as thin coils; however the voltage sense electrodes 212 and 214 may be relatively long axially to reduce the contact resistance. As described above, the voltage sense electrodes 212 and 214 produce different voltages at respective ports of the receiver device 302, which are coupled to the one or more optical fibers 220.

Each of the voltage electrode sensors 212 and 214 is located within a respective groove on an outer surface of the housing. In this example, the voltage sense electrodes 212 and 214 wrap around the housing and may be positioned to be flush with the outer diameter of the surface. The voltage sense electrodes 212 and 214 have electrical connections to the optical sensor 212 through ports (or holes) that are on the conductive sensor packaging (or housing).

Referring to FIG. 5B, the receiver device 302 includes an optical sensor 210 depicted as a fiber receiver that is coupled to one or more optical fibers 220 extending along the axial length of the downhole galvanic logging system. The optical sensor 210 may facilitate coupling of the electrical energy into the one or more optical fibers 220. In this respect, the optical sensor 210 may be configured to generate an optical signal based on one or more electromagnetic measurements and send the optical signal to the surface through the one or more optical fibers 220. Electrical circuitry may be used in the place of the optical sensor 210. Electrical conductors or wireless telemetry also may be used to replace the optical sensor 210. In one or more implementations, the receiver device 302 includes a magnetic based electromagnetic sensor configured to obtain one or more magnetic measurements in place of the optical sensor 210.

The receiver device 302 may be made of, or include a housing made of a conductive material with the optical sensor 210 located within the housing. The housing may have a cylindrical shape with substantially symmetrical dimensions. In FIG. 5B, the housing includes a metallic lining 504 and an insulator layer 502 disposed over the metallic lining 504. The insulator layer 502 may be used outside the conductive sensor packaging for chemical and mechanical protection against corrosion and pressure. The transmission line 216 has wire connections at opposite ends of the housing that are electrically connected to each other through the metallic lining 504. In this example, line portion 304a is coupled to the metallic lining 504 at a first port of the housing and the line portion 304b is coupled to the metallic lining 504 at a second port of the housing such that the return current can flow through the receiver device 302 with no resulting magnetic fields therein.

In FIGS. 5A and 5B, the insulation wires (e.g., line portions 304a and 304b) that are connecting the receiver device 302 to the voltage sense electrodes 212 and 214 need to pass within the conductive backbone (or housing). This can be accomplished without creating a significant imbalance by making a hole in the backbone and passing the insulation wires through the housing. The thickness and material of the space in between the voltage sense electrodes 212 and 214 and backbone determines the capacitive coupling between them. Since all laterolog tools operate with low frequency alternating current (AC) excitation, there is some finite capacitive coupling occurring, which can be approximated as follows:

$$R = R_m * L/((r_{borehole} * r_{borehole}) - (r_{electrode} * r_{electrode}))/\pi$$

$$A = 2\pi r_{electrode} l$$

$$C = \in A/d$$

$$\omega = 2\pi f$$

$$Z_c = 1/j\omega C$$

$$Z = 1/(1/R + 1/Z_c)$$

where $R_m$ is the mud resistivity, L is the separation between the exciter electrodes 206 and 208, $r_{borehole}$ is the radius of borehole (or wellbore), $r_{electrode}$ is the radius of the voltage sense electrode, R is the estimated resistance between the voltage sense electrodes 212 and 214, l is length of the voltage sense electrode, A is the area of voltage sense electrode, d is the separation between the voltage sense electrode and backbone, C is approximate capacitance (ignoring the fringing effects), f is the frequency, ω is the radial frequency, Z is the total impedance. In this example, d should be chosen large enough to have a negligible effect on Z, which is typically lower than 3%.

In one or more implementations, the cylindrical conducting backbone can be replaced by an insulated wire mesh depicted as a "squirrel cage" or any structure referred to as a Faraday shield, and similar results could be obtained. The insulated wires should be homogeneously distributed enough to achieve good balancing that can optimally cancel magnetic fields inside the insulated wire mesh.

The present disclosure can employ approaches for conversion of electrical potentials to optical signals in fiber as are known to those of skill in the art. For example, the voltage differential seen at the voltage sense electrodes 212 and 214 can be used to stretch a piezoelectric (PZT) material with an optical fiber bonded along a corresponding free stroke axis. The change in length of the PZT would result in a stretch of the optical fiber, which can be measured at the surface through interferometric methods as are known to those of skill in the art.

In addition to moving the magnetic flux lines away from the receiver wiring (e.g., the transmission lines 216 and 218), the subject system also can move (or suppress) resulting magnetic fields away from sensitive parts of any electronic components that may be present, such as transformers.

The downhole galvanic logging system 300 and 400 as discussed respectively in FIGS. 3 and 4 can be combined with a magnetic shield to improve the crosstalk rejection performance. In particular, receiver electronics (e.g., the receiver device 302) as a whole can be placed in a magnetic shield, along with the wiring (e.g., the line portions 304a and 304b). In this respect, crosstalk resulting from coupling between undesired electric fields is also minimized.

Figure 6:
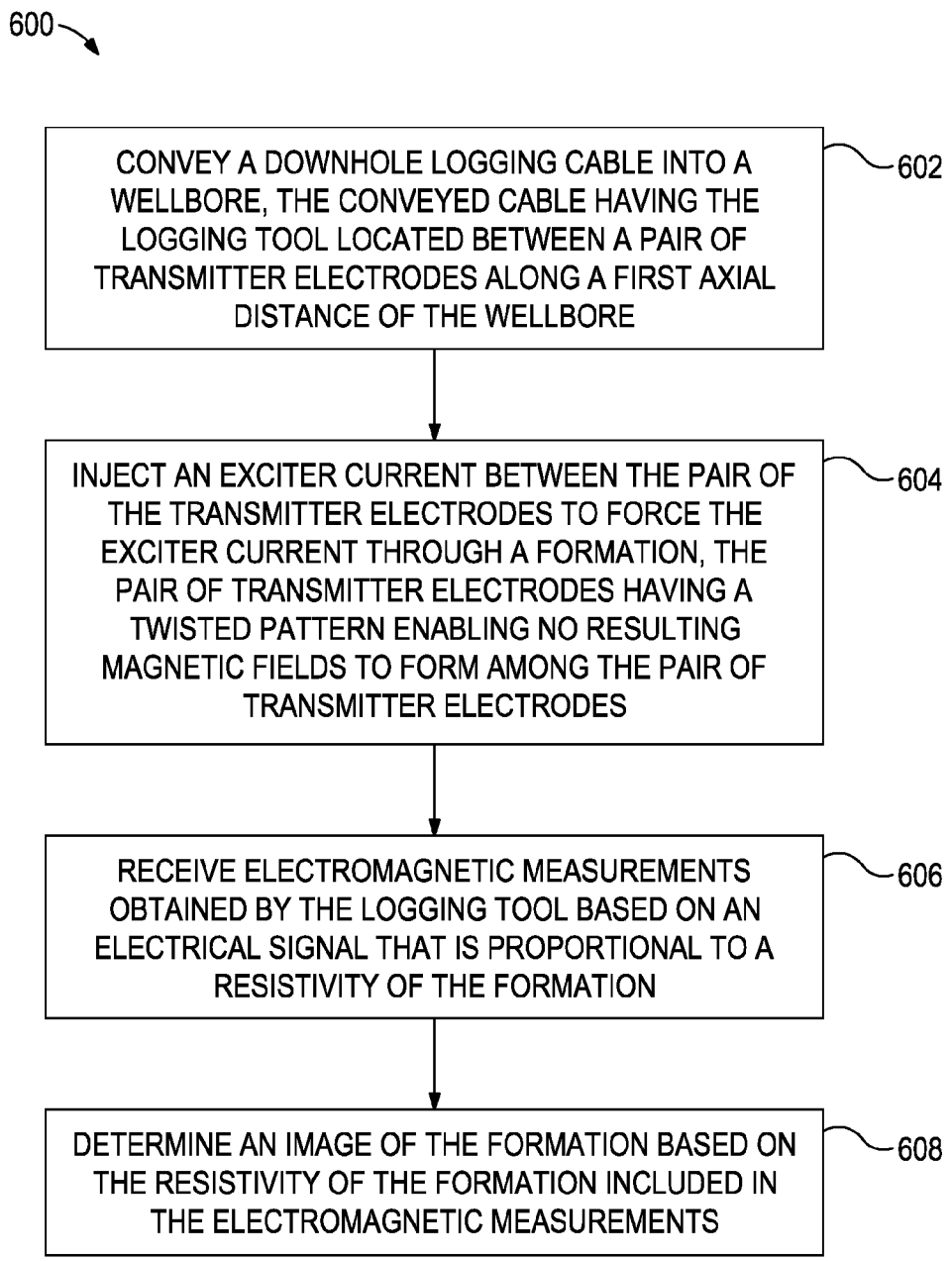
FIG. 6 is a flowchart of an exemplary process for downhole galvanic measurements using an exemplary downhole galvanic logging system in accordance with one or more embodiments of the subject technology.

FIG. 6 is a flowchart of an exemplary process 600 for downhole galvanic measurements using an exemplary downhole galvanic logging system in accordance with one or more embodiments of the subject technology. For explanatory purposes, the exemplary process 600 is described herein with reference to the wellbore system 100 of FIG. 1; however, the example process 600 is not limited to the wellbore system 100 of FIG. 1, and the exemplary process 600 may be performed by one or more components of the wellbore system 100, such as the downhole tool 112. Further for explanatory purposes, the blocks of the exemplary process 600 are described herein as occurring in serial, or linearly. However, multiple blocks of the example process 600 may occur in parallel. In addition, the blocks of the exemplary process 600 need not be performed in the order shown and/or one or more of the blocks of the exemplary process 600 need not be performed.

In step 602, the downhole galvanic logging system can convey a downhole logging cable (e.g., the sensing cable 120) from a wellhead (e.g., wellhead 104) into a downhole such as a wellbore (e.g., the wellbore 108). The downhole logging cable can have a surface end and a distal end, and include one or more optical fibers (e.g., optical fibers 220) and a logging tool (e.g., logging tool 112) with a generator (e.g., generator 130) arranged at the surface end. The optical fibers can extend along an axial length of the downhole logging cable. The conveyed downhole logging cable can have the logging tool located between a pair of transmitter electrodes (e.g., voltage sense electrodes 212 and 214) along a first axial distance of the wellbore. At least one transmitter electrode of the pair of transmitter electrodes can have a connection to the generator through opposite ends of the logging tool.

In step 604, the downhole galvanic logging system can inject an exciter current between the pair of transmitter electrodes to force the exciter current through a formation (e.g., formation 110). The pair of transmitter electrodes can have a twisted pattern that enables substantially no resulting magnetic fields to form beyond the pair of transmitter electrodes.

In step 606, the downhole galvanic logging system can receive electromagnetic measurements from the optical fibers with a signal processor (e.g., signal processing unit 150) arranged at the surface end. The electromagnetic measurements can be obtained by the logging tool based on an electrical signal that is proportional to a resistivity of the formation. The electromagnetic measurements may be obtained by the logging tool with the logging tool located between the pair of transmitter electrodes along a second axial distance of the wellbore. In this example, the second axial distance is greater than the first axial distance.

The downhole galvanic logging system may detect the electrical signal as a voltage drop with at least two voltage electrodes arranged in the logging tool. The downhole galvanic logging system may provide the electrical signal to the optical fibers with an optical sensor (e.g., optical sensor 210) arranged within the logging tool. The downhole galvanic logging system may provide the electromagnetic measurements as an optical signal from the optical sensor to the surface end through the plurality of optical fibers. The downhole galvanic logging system may detect the electrical signal as an induced magnetic field with at least two magnetic-sensing electrodes arranged in the logging tool. In step 608, the downhole galvanic logging system can determine an image of the formation based on the resistivity of the formation included in the electromagnetic measurements.

To facilitate a better understanding of the present disclosure, the following examples of preferred or representative embodiments are given. In no way should the following examples be read to limit, or to define, the scope of the disclosure.

Embodiments disclosed herein include:

A. A downhole galvanic logging system including a first transmitter electrode configured to convey an exciter current into a formation and a second transmitter electrode configured to receive a return current based on the exciter current conveyed through the formation. The first set of transmitter electrodes and the second set of transmitter electrodes being permanently placed in a borehole. The downhole galvanic logging system includes a first transmission line coupled to the first transmitter electrode and configured to carry the exciter current. The downhole galvanic logging system also includes a second transmission line coupled to the second transmitter electrode and configured to carry the return current. The first transmission line can be arranged in a parallel pattern with the second transmission line. The downhole galvanic logging system also includes a receiver device positioned between the first transmitter electrode and the second transmitter electrode along an axial length of the downhole galvanic logging system. The receiver device can be configured to detect an electrical signal induced by the exciter current flowed within the formation where the electrical signal is altered by at least one parameter of the formation. The second transmitter electrode can be attached to one end of the receiver device with the second transmission line connected to the second transmitter electrode through the receiver device.

B. A method for downhole galvanic measurements includes conveying a downhole logging cable into a wellbore. The downhole logging cable can have a surface end and a distal end, and include optical fibers and a logging tool with a generator arranged at the surface end. The optical fibers can extend along an axial length of the downhole logging cable. The conveyed downhole logging cable can have the logging tool located between a pair of transmitter electrodes along a first axial distance of the wellbore. At least one transmitter electrode of the pair of transmitter electrodes can have a connection to the generator through opposite ends of the logging tool. The method includes injecting an exciter current between the pair of transmitter electrodes to force the exciter current through a formation. The pair of transmitter electrodes can have a twisted pattern that enables substantially no resulting magnetic fields to form beyond the pair of transmitter electrodes. The method also includes receiving electromagnetic measurements from the optical fibers with a signal processor arranged at the surface end. The electromagnetic measurements can be obtained by the logging tool based on an electrical signal that is proportional to a resistivity of the formation. The method further includes determining an image of the formation based on the resistivity of the formation included in the electromagnetic measurements.

Each of embodiments A and B may have one or more of the following additional elements in any combination: Element 1: further comprising a generator coupled to the first transmission line and the second transmission line, the generator configured to generate the exciter current. Element 2: wherein the first transmitter electrode and the second transmitter electrode have connections at opposite ends of the receiver device that are substantially centered and axially oriented with respect to the receiver device for at least a first axial distance along a wellbore. Element 3: wherein the first transmitter electrode and the second transmitter electrode are substantially equidistant from respective ends of the receiver device. Element 4: wherein the first transmitter electrode and the second transmitter electrode have connections at opposite ends of the receiver device for at least a second axial distance along the wellbore, the second axial distance being greater than the first axial distance. Element 5: wherein the first transmitter electrode is located at a first distance from a first end of the receiver device and the second transmitter electrode is located at a second distance from a second end of the receiver device, the second distance being greater than the first distance. Element 6: wherein the receiver device comprises a magnetic based electromagnetic sensor configured to obtain one or more magnetic measurements. Element 7: wherein the receiver device comprises an optical sensor coupled to one or more optical fibers extending along the axial length of the downhole galvanic logging system, the optical sensor configured to generate an optical signal based on one or more electromagnetic measurements and send the optical signal to the surface through the one or more optical fibers. Element 8: wherein the receiver device comprises at least two voltage electrode sensors that are configured to detect a voltage drop between the at least two voltage electrode sensors. Element 9: wherein the receiver device comprises a housing made of a conductive material with the optical sensor located within the housing. Element 10: wherein the housing has a cylindrical shape with substantially symmetrical dimensions, wherein the housing has a metallic lining and an insulator layer over the metallic lining, and wherein the second transmission line has connections at opposite ends of the housing that are electrically connected to each other through the metallic lining. Element 11: wherein each of the at least two voltage electrode sensors is located within a respective groove on a surface of the housing, and wherein the at least two voltage electrodes have connections to the optical sensor through the housing. Element 12: wherein an in-phase component of the electrical signal is substantially proportional to a resistivity of the formation, or an out-of phase component of the electrical signal is substantially proportional to a dielectric constant of the formation. Element 13: further comprising a second receiver device at a first distance from the surface, the receiver device being a second distance from the surface, the first distance being greater than the second distance, the second receiver device configured to detect a second electrical signal based on a second exciter current flowed within the formation, the second exciter current being smaller than the exciter current. Element 14: wherein the at least one parameter of the formation comprises one or more of a resistivity, a dielectric constant, a magnetic permeability or a layer boundary position.

Element 15: further comprising detecting the electrical signal as a voltage drop with at least two voltage electrodes arranged in the receiver device. Element 16: further comprising providing the electrical signal to the plurality of optical fibers with an optical sensor arranged within the receiver device. Element 17: further comprising providing the electromagnetic measurements as an optical signal from the optical sensor to the surface end through the plurality of optical fibers. Element 18: further comprising detecting the electrical signal as an induced magnetic field with at least two magnetic-sensing electrodes arranged in the receiver device. Element 19: wherein the electromagnetic measurements are obtained by the logging tool with the logging tool located between the pair of transmitter electrodes along a second axial distance of the wellbore, and wherein the second axial distance is greater than the first axial distance.

By way of non-limiting example, embodiment A may be combined with: Elements 1, 2 and 3; Elements 1, 2, 4 and 5; Elements 1, 7, 8, 9 and 10; Elements 1, 7, 8, 9 and 11; Elements 1, 7, 8, 9 and 12; Elements 1 and 13; etc.

Further by way of non-limiting example, embodiment B may be combined with: Elements 14 and 15; Elements 15 and 16; Elements 14 and 17; Elements 14 and 18; etc.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

What is claimed is:

1. A downhole galvanic logging system, comprising:
   a first set of transmitter electrodes configured to convey an exciter current into a formation;
   a second set of transmitter electrodes configured to receive a return current based on the exciter current conveyed through the formation, the first set of transmitter electrodes and the second set of transmitter electrodes being permanently placed in a borehole;
   a first transmission line conductor coupled to the first set of transmitter electrodes and configured to carry the exciter current;
   a second transmission line conductor coupled to the second set of transmitter electrodes and configured to carry the return current back to a termination point of the second transmission line conductor, the first transmission line conductor arranged in a parallel pattern with the second transmission line conductor; and
   a receiver device positioned between the first set of transmitter electrodes and the second set of transmitter electrodes along an axial length of the downhole galvanic logging system, the receiver device configured to detect an electrical signal induced by the exciter current flowed within the formation where the electrical signal is altered by at least one parameter of the formation, the second set of transmitter electrodes being coupled to one end of the receiver device with the second transmission line conductor coupled to the second set of transmitter electrodes through the receiver device.

2. The downhole galvanic logging system of claim 1, further comprising an exciter coupled to the first transmission line conductor and the second transmission line conductor, the exciter configured to generate the exciter current.

3. The downhole galvanic logging system of claim 1, wherein the first set of transmitter electrodes and the second set of transmitter electrodes have connections at opposite ends of the receiver device that are substantially centered and axially oriented with respect to the receiver device for at least a first axial distance along a wellbore.

4. The downhole galvanic logging system of claim 3, wherein the first set of transmitter electrodes and the second set of transmitter electrodes are substantially equidistant from respective ends of the receiver device.

5. The downhole galvanic logging system of claim 3, wherein the first set of transmitter electrodes and the second set of transmitter electrodes have connections at opposite ends of the receiver device for at least a second axial distance along the wellbore, the second axial distance being greater than the first axial distance.

6. The downhole galvanic logging system of claim 5, wherein the first set of transmitter electrodes is located at a first distance from a first end of the receiver device and the second set of transmitter electrodes is located at a second distance from a second end of the receiver device, the second distance being greater than the first distance.

7. The downhole galvanic logging system of claim 1, wherein the receiver device comprises a magnetic based electromagnetic sensor configured to obtain one or more magnetic measurements.

8. The downhole galvanic logging system of claim 1, wherein the receiver device comprises an optical sensor coupled to one or more optical fibers extending along the axial length of the downhole galvanic logging system, the optical sensor configured to generate an optical signal based on one or more electromagnetic measurements and send the optical signal to the surface through the one or more optical fibers.

9. The downhole galvanic logging system of claim 8, wherein the receiver device comprises at least two voltage electrode sensors that are configured to detect a voltage drop between the at least two voltage electrode sensors.

10. The downhole galvanic logging system of claim 9, wherein the receiver device comprises a housing made of a conductive material with the optical sensor located within the housing.

11. The downhole galvanic logging system of claim 10, wherein the housing has a cylindrical shape with substantially symmetrical dimensions, wherein the housing has a metallic lining and an insulator layer over the metallic lining, and wherein the second transmission line conductor has connections at opposite ends of the housing that are electrically connected to each other through the metallic lining.

12. The downhole galvanic logging system of claim 10, wherein each of the at least two voltage electrode sensors is located within a respective groove on a surface of the housing, and wherein the at least two voltage electrodes have connections to the optical sensor through the housing.

13. The downhole galvanic logging system of claim 1, wherein an in-phase component of the electrical signal is substantially proportional to a resistivity of the formation, or an out-of phase component of the electrical signal is substantially proportional to a dielectric constant of the formation.

14. The downhole galvanic logging system of claim 1, further comprising a second receiver device at a first distance from the surface and coupled to the first and second transmission line conductors, the receiver device being a second distance from the surface, the first distance being greater than the second distance, the second receiver device configured to detect a second electrical signal based on a second exciter current flowed within the formation, the second exciter current being smaller than the exciter current.

15. The downhole galvanic logging system of claim 1, wherein the at least one parameter of the formation comprises one or more of a resistivity, a dielectric constant, a magnetic permeability or a layer boundary position.

16. A method for downhole galvanic measurements, comprising:
conveying a downhole logging cable into a wellbore, the downhole logging cable having a surface end and a distal end, and comprising a plurality of optical fibers and a logging tool with an exciter arranged at the surface end, the plurality of optical fibers extending along an axial length of the downhole logging cable, the conveyed downhole logging cable having the logging tool located between a pair of transmitter electrodes permanently placed along a first axial distance of the wellbore, at least one transmitter electrode of the pair of transmitter electrodes having a connection to the exciter through opposite ends of the logging tool;
injecting an exciter current between the pair of transmitter electrodes from the exciter to force the exciter current through a formation, the pair of transmitter electrodes having a parallel pattern that enables substantially no resulting magnetic fields to form beyond the pair of transmitter electrodes;
receiving electromagnetic measurements from the plurality of optical fibers with a signal processor arranged at the surface end, the electromagnetic measurements being obtained by the logging tool based on an electrical signal that is proportional to a resistivity of the formation; and
determining an image of the formation based on the resistivity of the formation included in the electromagnetic measurements.

17. The method of claim 16, further comprising detecting the electrical signal as a voltage drop using at least two voltage electrodes arranged in the logging tool.

18. The method of claim 16, further comprising at least one of:
providing the electrical signal to the plurality of optical fibers with an optical sensor arranged within the logging tool, or
providing the electromagnetic measurements as an optical signal from the optical sensor to the surface end through the plurality of optical fibers.

19. The method of claim 16, further comprising detecting the electrical signal as an induced magnetic field using at least two magnetic-sensing electrodes arranged in the logging tool.

20. The downhole galvanic logging system of claim 1, wherein at least a portion of the first transmission line conductor is part of a twisted pair with at least a portion of the second transmission line conductor.

21. The method of claim 16, wherein a first transmitter electrode of the pair of transmitter electrodes is coupled to a first transmission line, and a second transmitter electrode of the pair of transmitter electrodes is coupled to a second transmission line, at least a portion of the first transmission line forming a twisted pair with at least a portion of the second transmission line.

22. The downhole galvanic logging system of claim 1, wherein the detected electrical signal is used to measure a property of the formation.

* * * * *